(12) United States Patent
Shoemake et al.

(10) Patent No.: US 9,464,796 B2
(45) Date of Patent: *Oct. 11, 2016

(54) ILLUMINATION DEVICE

(71) Applicant: LUMEE, LLC, Boonton, NJ (US)

(72) Inventors: Allan Shoemake, Boonton, NJ (US);
William Winter, Boonton, NJ (US);
Juan Fernandez, Towaco, NJ (US);
Paul McGrath, Flanders, NJ (US);
Juan David Londono Restrepo, Gijon (ES)

(73) Assignee: LuMee, LLC, Boonton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,830

(22) Filed: Jun. 10, 2015

(65) Prior Publication Data
US 2015/0276187 A1    Oct. 1, 2015

Related U.S. Application Data

(63) Continuation-in-part of application No. 13/758,212, filed on Feb. 4, 2013, now Pat. No. 9,086,610.

(60) Provisional application No. 61/594,653, filed on Feb. 3, 2012.

(51) Int. Cl.
*F21V 21/00*    (2006.01)
*F21V 33/00*    (2006.01)
(Continued)

(52) U.S. Cl.
CPC ............... *F21V 21/00* (2013.01); *F21V 23/04* (2013.01); *F21V 33/0052* (2013.01);
(Continued)

(58) Field of Classification Search
CPC ..... F21V 21/00; F21V 23/04; F21V 33/0052
See application file for complete search history.

(56) References Cited

U.S. PATENT DOCUMENTS

| | | |
|---|---|---|
| 5,859,481 A | 1/1999 | Banyas |
| 6,265,984 B1 | 7/2001 | Molinaroli |

(Continued)

FOREIGN PATENT DOCUMENTS

| | | |
|---|---|---|
| CN | 201504257 U | 6/2010 |
| CN | 203180997 U | 9/2013 |

(Continued)

OTHER PUBLICATIONS

LexisNexis Search Report Office dated Jan. 27, 2016 for U.S. Appl. No. 14/735,830.

(Continued)

*Primary Examiner* — Elmito Breval
(74) *Attorney, Agent, or Firm* — DLA Piper LLP (US)

(57) ABSTRACT

The illumination device generally has a light source and an attachment assembly that connects the light source to the computing device. The light source may be a plurality of LEDs or a light panel using electroluminescent lighting. The illumination device may further comprise power source and at least one touch sensitive switch. The illumination device may also be integrally connected to the computing device and uses the power source of the computing device and being controlled by buttons or switches of the computing device. The illumination device may also provide additional signals for incoming calls or ongoing calls by displaying different light intensity, pattern, or color. In some instances, a light cover is implemented to cover the light sources and diffuse light emanating therefrom.

20 Claims, 9 Drawing Sheets

(51) Int. Cl.
  *F21V 23/04* (2006.01)
  *G06F 1/16* (2006.01)
  *H04M 1/22* (2006.01)
  *H04N 7/14* (2006.01)
  *H04M 19/04* (2006.01)

(52) U.S. Cl.
  CPC .......... *G06F 1/1626* (2013.01); *G06F 1/1632* (2013.01); *H04M 1/22* (2013.01); *H04M 19/048* (2013.01); *H04N 7/142* (2013.01)

(56) References Cited

U.S. PATENT DOCUMENTS

| | | |
|---|---|---|
| 6,435,690 B1 | 8/2002 | Till |
| 6,608,996 B1 | 8/2003 | Laurikka et al. |
| 7,113,196 B2 | 9/2006 | Kerr |
| 7,612,997 B1 | 11/2009 | Diebel et al. |
| 7,631,979 B1 | 12/2009 | Brown et al. |
| 7,782,610 B2 | 8/2010 | Diebel et al. |
| 7,841,729 B2 | 11/2010 | Geddes |
| 7,862,185 B2 | 1/2011 | Noba |
| 7,893,953 B2 | 2/2011 | Krestakos et al. |
| 7,969,505 B2 | 6/2011 | Saito |
| 8,022,977 B2 | 9/2011 | Kanade |
| 8,367,235 B2 | 2/2013 | Huang et al. |
| 8,390,255 B1 | 3/2013 | Fathollahi |
| 8,428,644 B1 | 4/2013 | Harooni |
| 8,825,124 B1 | 9/2014 | Davies et al. |
| 8,840,274 B1 | 9/2014 | Adams et al. |
| 8,971,039 B2 | 3/2015 | Huang et al. |
| 9,075,568 B1 | 7/2015 | Gray |
| 9,086,610 B2 | 7/2015 | Shoemake et al. |
| 9,104,371 B2 | 8/2015 | Sartee et al. |
| 2003/0096642 A1 | 5/2003 | Bessa et al. |
| 2004/0090773 A1 | 5/2004 | Bryan |
| 2004/0233153 A1 | 11/2004 | Robinson |
| 2005/0047132 A1 | 3/2005 | Dowling et al. |
| 2005/0253923 A1 | 11/2005 | Komori et al. |
| 2006/0052063 A1 | 3/2006 | Lohr |
| 2008/0122821 A1 | 5/2008 | Nilsson et al. |
| 2009/0027874 A1 | 1/2009 | Chang |
| 2009/0152445 A1* | 6/2009 | Gardner, Jr. .......... G09G 3/3406 250/214 AL |
| 2009/0170532 A1 | 7/2009 | Lee et al. |
| 2009/0174759 A1 | 7/2009 | Yeh et al. |
| 2010/0321467 A1 | 12/2010 | Goodman |
| 2011/0195753 A1* | 8/2011 | Mock .................. H04B 1/3888 455/566 |
| 2011/0228096 A1 | 9/2011 | Friel et al. |
| 2012/0052929 A1 | 3/2012 | Thammasouk et al. |
| 2012/0077548 A1 | 3/2012 | Goldberg |
| 2012/0302294 A1 | 11/2012 | Hammond et al. |
| 2013/0194775 A1 | 8/2013 | Geddes et al. |
| 2013/0201653 A1 | 8/2013 | Shoemake et al. |
| 2013/0206844 A1 | 8/2013 | Chen et al. |
| 2013/0260825 A1 | 10/2013 | Hagenstad |
| 2013/0301235 A1 | 11/2013 | Harooni |
| 2013/0316690 A1 | 11/2013 | Wildner et al. |
| 2014/0055978 A1 | 2/2014 | Gantz et al. |
| 2014/0179375 A1 | 6/2014 | Yang et al. |
| 2015/0050965 A1 | 2/2015 | Perry |
| 2015/0207963 A1 | 7/2015 | Sayag |
| 2015/0263775 A1 | 9/2015 | Vila |
| 2015/0349831 A1 | 12/2015 | Young et al. |
| 2015/0354793 A1 | 12/2015 | Huang |
| 2015/0355525 A1 | 12/2015 | Abrams |

FOREIGN PATENT DOCUMENTS

| | | |
|---|---|---|
| CN | 204190808 U | 3/2015 |
| CN | 204633840 U | 9/2015 |
| DE | 20005458 U1 | 6/2000 |
| EP | 0738080 B1 | 11/1999 |
| EP | 1414222 B1 | 4/2004 |
| EP | 1474735 B1 | 11/2004 |
| EP | 1610564 B1 | 12/2005 |
| EP | 2716022 A1 | 4/2014 |
| JP | 2005252871 A | 9/2005 |
| KR | 1020140037995 | 3/2014 |
| WO | 02/103504 | 12/2002 |
| WO | 2008135816 A1 | 11/2008 |
| WO | 2012/162395 A1 | 11/2012 |
| WO | 2013154857 A1 | 10/2013 |
| WO | 2014118531 A1 | 8/2014 |
| WO | 2015090115 A1 | 6/2015 |

OTHER PUBLICATIONS http://www.mophie.com/shop/iphone-6 Mophie iPhone 6s/6 battery cases & accessories.
https://www.youtube.com/watch!v=tNstjBEu274 youtube video: Top 5 Best iPhone 5S Battery Cases—mophie, Incipio, Belkin, Lenmar . . .
http://www.belkin.com/us/F8W292-Belkin/p/P-F8W292/?initialMaxPrice=109.99&initialMinPrice=4.99&maxPrice=109.99&minPrice=65.89 Belkin Grip Power Battery Case for iPhone 5 and iPhone 5s.
https://web.archive.org/web/20151030025405/http://www.buqutech.com/products/iphone-6-battery-case BuQu Tech PowerArmour™ Battery Case for iPhone 6.
https://web.archive.org/web/20150510184656/http://www.farbetechnik.com/products/external-battery-cases/iphone-6-external-battery-case Farbe Technik iPhone 6 External Battery Case.
http://www.otterbox.com/Resurgence-Power-Case-for-iPhone-5/5s/apl33-iphone-5s.default.pd.html OtterBox iPhone 5/5s Resurgence Power Case.
https://web.archive.org/web/20150503163054/http://www.incipio.com/chargers/power-solutions-for-apple/iphone-power-solutions.html Incipio iPhone Accessories.
http://www.lenmar.com/meridian-iphone5-battery-case-gold Lenmar Meridian iPhone 5/5s Power Case.
https://web.archive.org/web/20151026065000/http://www.maxboostpower.com/shop/maxboost-atomic-s-protective-battery-case-for-iphone-5s-5-mfi-certified-white-silver-2 Maxboost Atomic S Protective Battery Case for iPhone 5S/5.
https://web.archive.org/web/20141202094804/http://www.ibattz.com/products_power_refuel.php iBattz Mojo Refuel Battery Case for iPhone 5/5S.
http://www.mophie.com/shop/iphone-5 Mophie iPhone SE/5s/5 battery cases & accessories.
http://www.mycharge.com/products/freedom-2000 MyCharge Freedom 2000.
http://junopower.com/products/novapak-the-iphone-6-extended-battery-iphone-case Juno Power Novapak—The iPhone 6 Battery Case.
http://www.phonesuit.com/elite-battery-cases/ PhoneSuit Battery Cases.
http://www.power-skin.com/ PowerSkin Spare Battery Case.
Phil Dzikiy, "Review: Incipio offGRID Express for iPhone 6," iLounge, Jan. 15, 2015 http://www.ilounge.com/index.php/reviews/entry/incipio-offgrid-express-for-iphone-6.
Phil Dzikiy, "Review: Tylt Energi Sliding Power Case for iPhone 6," iLounge, Dec. 23, 2014. http://www.ilounge.com/index.php/reviews/entry/tylt-energi-sliding-power-case-for-iphone-6.
http://www.tylt.com/energi-sliding-power-case-ip5/ Tylt Energi sliding power case for iphone 5/5s.
http://www.mophie.com/patents.
The International Search Report and the Written Opinion of the International Searching Authority issued Aug. 18, 2016 for corresponding International Application No. PCT/US2016/032685.

* cited by examiner

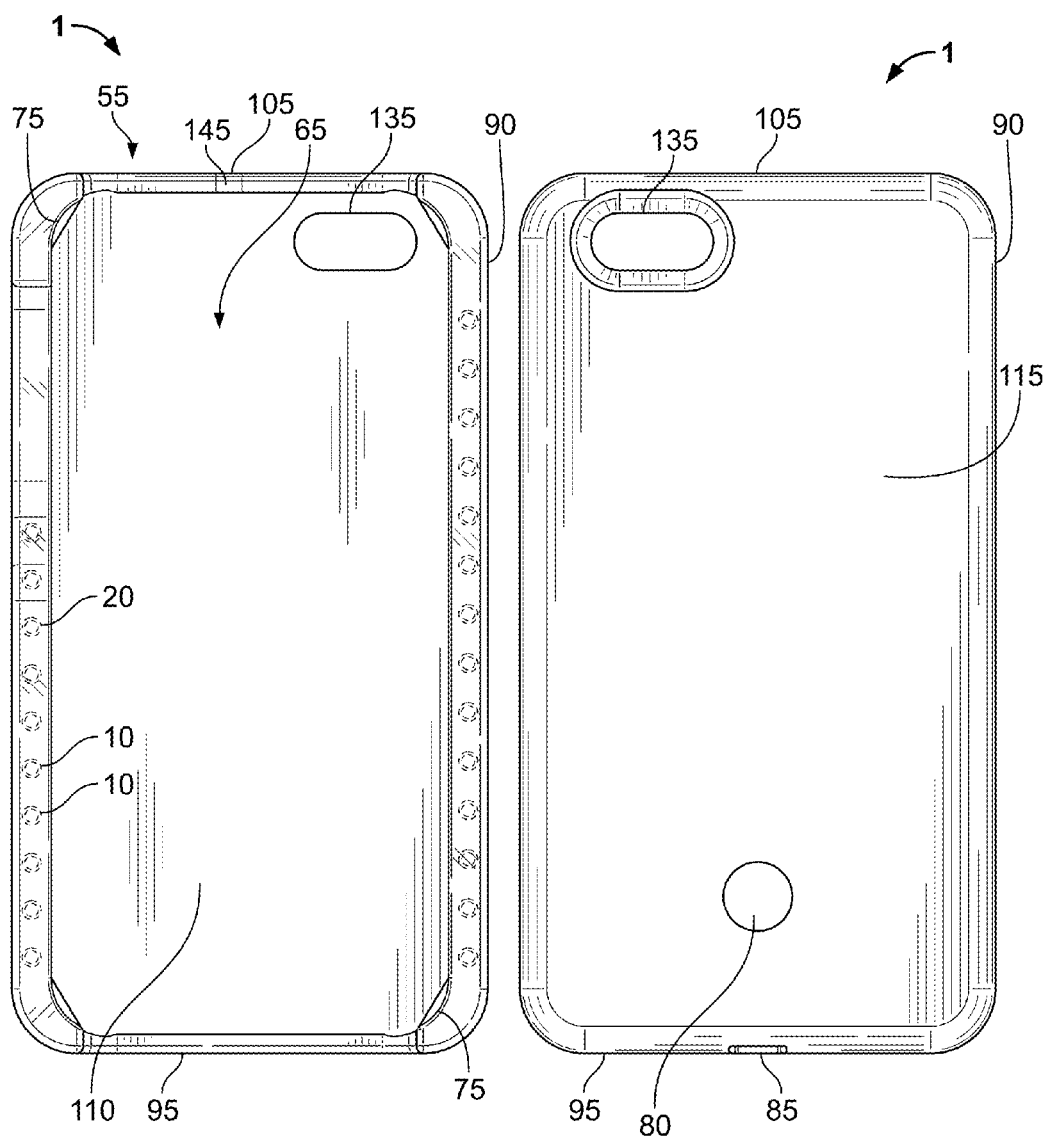

ILLUMINATION DEVICE

CLAIM OF PRIORITY

This application claims priority to U.S. application Ser. No. 13/758,212 filed on Feb. 4, 2013 which claims priority to U.S. Application 61/594,653 filed on Feb. 3, 2012, the contents of both of which are herein fully incorporated by reference in its entirety.

FIELD OF THE EMBODIMENTS

The invention relates to an illumination device, and more particularly to an illumination device attached to a computing device, especially a handheld computing device such as a smart phone, to facilitate video calls, teleconferences, other camera-related processes, and other applications conducted with the computing device requiring optimized illumination.

BACKGROUND OF THE EMBODIMENTS

Computing devices, especially handheld computing devices, have undergone explosive development in the past two decades. Here, computing devices refer to but are not limited to: desktop computers, laptop computers, and handheld computing devices such as but not limited to smart phones such as iPhones® or Android® phones, computing tablets such as iPad®, Personal Data Assistants (PDAs), and other devices that are relatively small and light and are equipped with basic computing and internet connecting capabilities. Computing devices are playing more and more significant roles in people's work, entertainment, and communications.

Most of the computing devices nowadays are equipped with cameras. In many cases, especially for handheld computing devices, there are two cameras, one on the front side of the device—the same side with a general display screen, and the other one on the back side. One fairly widespread usage of the computing devices is video call, or video conference in some instances, during which both video images and audio signals are transmitted and received. Most likely the video images are captured with the front side camera, allowing a user of the device to see the display on the device and be visible at the same time. Video calls enable the callers to hear and see the other person at the same time. Combined with the mobile capacity of the handheld computing devices, video calls strongly facilitate communication and interaction between the parties.

One drawback of the video call conducted on a computing device, however, is the unpredictable and often far-from-ideal illumination, which renders the video call less attractive or even impossible to proceed. This problem is especially acute for the handheld computing devices. Due to their mobility, video calls conducted with handheld computing devices may be carried out in some locations never been conceived previously. Instead of a nicely illuminated conference room, a user of a handheld computing device may find himself/herself in a car, in a dark room, or in some places with weak or impossible-to-adjust light, making it impossible to show the user's image properly. The current invention addresses this problem by providing an illumination device that may be attached to a computing device and enable a user to have manageable light for his/her video call or video conference. In addition, the illumination device introduced by the current invention may have numerous additional applications that would provide significant convenience and greatly improve the user experience of the computing device.

Review of Related Technology

U.S. Pat. No. 7,841,729 pertains to an illuminator device for illuminating one or more users in front web camera and a communication terminal having a bulb for emitting light; a reflector operatively associated with the bulb for projecting the emitted light; and an arm disposed between the bulb and the terminal for connection to the terminal are provided. The bulb is positionable relative to the web camera to provide optimal viewing of the user through the web camera. An illuminator device for illuminating one or more users in front of a web camera and a communications terminal having a frame and a screen having a plurality of bulbs, wherein the plurality of bulbs are disposed in the frame of the terminal to provide illumination to the face or faces of the user.

U.S. Pat. No. 7,631,979 pertains to a universal lighting system for use with a computer web camera including a digital computing device fitted with a web camera for capturing images of a subject for transmission over a worldwide communication network. A base clamping mechanism is affixed to the computing device. A light array is adjustably connected to the base clamping mechanism for illuminating the subject positioned before the web camera. A diffuser lens is flexibly connected to the base clamping mechanism and sealingly positioned over the web camera for diffusing received light for creating a clear image of the illuminated subject prior to transmission over the communication network.

Various devices are known in the art. However, their structure and means of operation are substantially different from the present disclosure. The other inventions also fail to solve all the problems taught by the present disclosure. At least one embodiment of this invention is presented in the drawings below and will be described in more detail herein.

SUMMARY OF THE EMBODIMENTS

The current invention discloses an illumination device to be used with a computing device, especially a handheld computing device. The illumination device comprises: a light source; a power connecter, and an attachment assembly affixing the light source to a computing device. The illumination device disclosed by the current invention would significantly improve the experience of video calls, video conferences, picture-taking, and other camera-related or unrelated activities conducted by a computing device.

In one embodiment the present invention describes and teaches an illumination device capable of being removably coupled to a computing device, the illumination device having an attachment assembly with a recess sized to receive the computing device, wherein the attachment assembly provides access to at least one touch sensitive surface along a top, a bottom, and/or a side of the computing device; at least one securement mechanism that retains the computing device within the recess; at least one light source contained within the attachment assembly, wherein the at least one light source is covered by a light cover; a touch sensitive button disposed on a surface of the attachment assembly, wherein the touch sensitive button changes an intensity of the at least one light source; and a power source operably coupled to the at least one light source.

In another embodiment of the present invention there is an illumination device for a computing device, the illumination device having an attachment assembly capable of being removably coupled to the computing device, wherein the attachment assembly has a front surface, a back surface, a top surface, a bottom surface, and at least two side surfaces, wherein the at least two side surfaces have a light rail disposed thereon that extend past the front surface; at least one touch sensitive button disposed on either the back surface or one of the at least two side surfaces; a charging port located on the bottom surface of the attachment assembly; a plurality of light sources located within the at least two side surfaces; and a power source contained within the attachment assembly and operably coupled the plurality of light sources.

In yet another embodiment of the present invention there is an illumination device for a computing device, the illumination device having an attachment assembly capable of being removably coupled to the computing device, wherein the attachment assembly has a front surface, a back surface, a top surface, a bottom surface, and at least two side surfaces, wherein each of the at least two side surfaces have at least one light rail comprising a light cover and a plurality of light sources, the at least one light rail extending past the front surface, and wherein the attachment assembly has a recess sized to receive the computing device; at least one touch sensitive button disposed on the back surface of the attachment assembly, wherein the at least one touch sensitive button changes an operative state of the plurality of light sources; a rechargeable battery contained within the attachment assembly and being operably coupled to the plurality of light sources; a charging port located on the bottom surface of the attachment assembly; at least two securement structures capable of retaining the computing device in the attachment assembly, wherein the at least two securement structures are lateral extensions extending from a separate light rail, and wherein the computing device is released from the at least two securement structures by flexing of the attachment assembly.

As indicated above, "computing device" used here is a broad concept and it refers to but is not limited to: a desktop computer, a laptop computer, and a handheld computing device such as but not limited to smart phones such as iPhone® or Android® phones, computing tablets such as iPad®, personal data assistants (PDAs), and other devices that are relatively small and light and are equipped with basic computing and network connecting capabilities. Since the usage of the present invention is more clearly demonstrated on handheld computing devices, the discussions will be focusing on such devices. However, it should be clear that the illumination device disclosed here may also be implemented to desktop and laptop computers and have significant beneficial effects.

With the implementation of front and back cameras, handheld computing devices may be used in ways that could not be conceived before. As indicated above, one of the applications is video call or video conference that allows the users to see and speak to one another at the same time. In most cases, a user is holding the handheld computing device with the front of the handheld computing device, defined as the side having a display screen, facing the user. The front camera, the camera on the same side as the display screen, is thus capable of capturing the image of the user, especially the image of the user's face. Through its networking capacities, the handheld computing device transfers the captured image, as well as audio signals recorded, to the other party/parties engaged in the video call or video conference.

Such a communication experience, however, may be spoiled by weak or improper lighting. When it is too dark, it is very difficult for the front camera to capture a usable image of the user, making a video call less attractive. Moreover, many other camera-related processes and applications conducted with a handheld computing device may have similar requirements for optimized lighting conditions. One simple example is taking a photograph or video recording with the handheld computing device, either of the user himself/herself, or of another person, or of any other scene or subject. When the ambient light is too weak, it may ruin the results of the picture or the video. Another example is the "mirror" application for handheld computing devices, with which a user may see his/her own image in the display. Poor ambient light conditions also harm the usage of such applications.

The current device addresses the problems listed above by attaching a light source, preferably a plurality of light-emitting diodes (LEDs) to the handheld computing device, allowing the light source to illuminate the user, especially the user's face, enabling the front camera or the back camera to capture an optimized image of the user or any other subject and facilitate the video call, the photo or video capturing, the "mirror" application, or any other camera-related experience.

Moreover, with the basic design, there may be numerous variations that would provide different kinds of embodiments of the illumination device to satisfy different needs for applications and users. Some of the applications do not even have to be camera-related because the illumination device disclosed herein may also have signaling capacities besides the functions to provide lighting.

The light source, as suggested, is preferably LED lights. However, the light source may also be other lights such as compact florescent lights (CFL) or electroluminescent light. In particular, electroluminescent light using algae-based wire and panels, such as the light based on RILI technology, may be incorporated as the light source in the current device. In addition, sometimes it is desirable to make the lights adjustable in terms of luminous intensity, viewing angles, and diffusion. The lights may have color either by using color lights or with the addition of a color cover. In general, implementing more adjustability may allow the illumination device to provide lighting for one or more persons and for various purposes. It may also enable the illumination device to flash, to demonstrate different patterns, and therefore satisfy different needs.

There may be a power source, separate from the power source for the handheld computing device. The power source may be connected to the lights through a power connector, providing energy needed for the illumination. The power source may be one or more batteries, such as the regular AAA zinc-carbon or alkaline battery, or any other type or size that may fit the needs in terms of energy needs or physical accommodation. The battery may be disposable or rechargeable, allowing flexibility as to cost-effectiveness and convenience. The battery may be connected to both the illumination device and the handheld computing device, providing energy to both devices, serving as a backup or extra power source to the handheld computing device. On the other hand, it is also possible to simply connect the light source to the handheld computing device and allow the light source to use the power of the handheld computing device, reducing the size and weight of the illumination device and making it more portable.

The illumination device includes an attachment assembly that affixes the light source to the handheld computing device. The attachment is preferred to be non-permanent, so that the lights may be added or removed as the user desires. The attachment assembly may take many forms. For example, it may be a flat case with an indentation to enclose a power source and power connector, while also having a recess or docking place for the handheld computing device to attach. The current invention encompasses all kinds of attachment assemblies that allow convenient connection between the lights and the handheld computing device. Moreover, the attachment assembly may serve additional purposes such as supporting the handheld computing device in an easy-to-view position, allowing a user of the handheld computing device to watch the device in a hand-free mode. In addition, more complex attachment assembly may include structures that allow the illumination device to be further integrated with the handheld computing device in terms of synergetic control and data sharing.

The illumination device may further comprise an external switch that allows the user to turn the lights on and off. However, it is possible, especially when the illumination device is sufficiently integrated with the handheld computing device, to use the buttons, switches, and menus on the handheld computing device to control the lights.

As indicated above, the illumination device may be used to facilitate video calls or video conferences or to enhance other camera related functions of the handheld computing device. In such a case, the illumination device taught by the current invention may enhance such experiences by providing additional and well-controlled illumination.

In addition, with further connection between the lights and the handheld computing device, the lights of the illumination device may serve as indicators for a handheld computing device's status or as signals for the applications being used on the handheld computing device. For example, the lights may flash or light up when there is an incoming call. Or the lights may change in lighting pattern, luminous intensity, or color when the user is speaking on the handheld computing device or when certain music or game is being played.

Also in the purview of the current invention is a series of computer programs or applications that may be used to control the illumination device. For example, a basic version of such a program would be able to adjust the luminous intensity, viewing angles, lighting pattern, and/or color of the illumination device. A more advanced program would allow the illumination device to synergize with the status of the handheld computing device, such as an incoming phone call. Still another advanced program may integrate the illumination device with another application so that the lights are partially controlled by the application.

In general, the illumination device is designed to be small, portable, versatile, energy efficient, durable, and fully compatible with the handheld computing device, or more generally, the computing device, that is to be used with the illumination device.

In summary, it is an object of the present invention to provide an illumination device that may be attached to a computing device, especially a handheld computing device.

Yet another object of the present invention is to provide an illumination device that may be powered by a power source.

Still another object of the present invention is to provide an illumination device that may be powered by a power source integral to a handheld computing device to which the illumination device is attached.

Yet another object of the present invention is to provide an illumination device that may be controlled by an external switch.

Still another object of the present invention is to provide an illumination device that may be controlled by buttons, switches, or menus integral to a handheld computing device to which the illumination device is attached.

Yet another object of the present invention is to provide an illumination device that has lights with adjustable intensity, angles, and diffusion.

Still another object of the present invention is to provide an illumination device that provides lights for one person as well as a group of persons.

Yet another object of the present invention is to provide an illumination device that provides illumination to a user of a handheld computing device during a video call or video conference.

Still another object of the present invention is to provide an illumination device that provides lights to a user of a handheld computing device for taking photographs or video for himself/herself, other persons, or other subjects.

Yet another object of the present invention is to provide an illumination device that provides illumination to a user of a handheld computing device when the user sees his/her image displayed on the handheld computing device.

Still another object of the present invention is to provide an illumination device that may light up, flash when there is an incoming call to the handheld computing device to which the illumination device is connected.

Still another object of the present invention is to provide an illumination device that is portable and easy to use.

Still another object of the present invention is to provide an illumination device that may change in lighting pattern, luminous intensity, viewing angles, or color.

Still another object of the present invention is to provide an illumination device that may serve as indicators or signals for a handheld computing device's status or an application on the handheld computing device.

Still another object of the present invention is to provide an illumination device that may light up, flash, or change the luminous intensity, viewing angles, lighting pattern, or color, when the user is speaking or when music or game is being played on the handheld computing device to which the illumination device is connected.

Still another object of the present invention is to provide an illumination device that diffuses light.

BRIEF DESCRIPTION OF THE DRAWINGS

FIG. 7 is a front view of another embodiment of the present invention which is not coupled or connected to a handheld computing device.

FIG. 8 is a back view of the embodiment as shown in FIG. 7.

DESCRIPTION OF THE PREFERRED EMBODIMENTS

Figure 1:
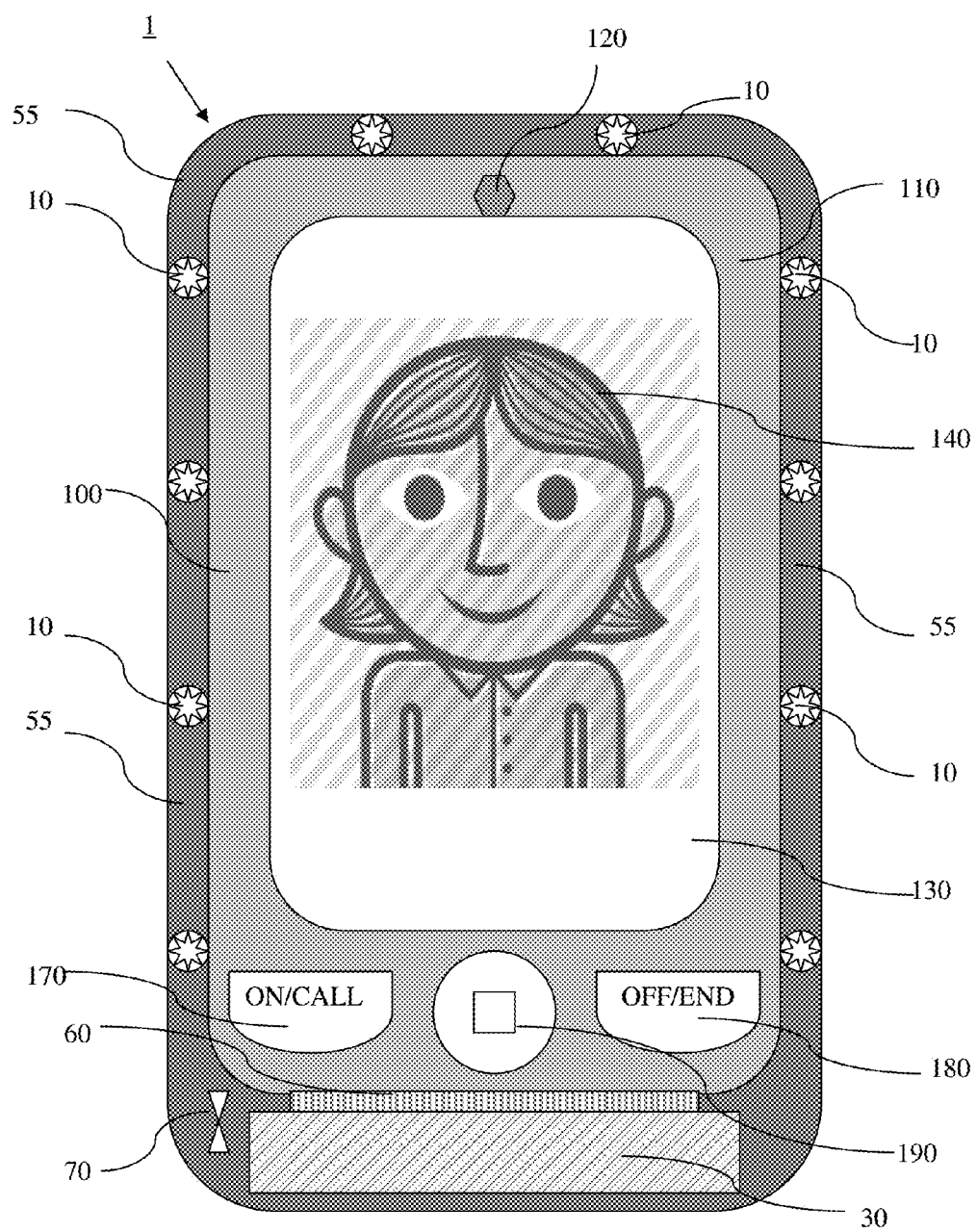
FIG. 1 is an isometric drawing of a front view of a first embodiment of the present invention when an illumination device is connected to a handheld computing device.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 is an isometric drawing of a front view of a first embodiment of the present invention when an illumination device is connected to a handheld computing device. Shown in FIG. 1 are the illumination device 1 attached to the handheld computing device 100, wherein the illumination device 1 comprises an attachment assembly, which here manifests itself as a case 55, a power source 30, a dock 60 for the handheld computing device 100, an illumination device switch 70, and a light source comprising a plurality of LEDs. For clarity purposes, not all the LEDs are marked in FIG. 1. Shown in FIG. 1 is also the handheld computing device 100 having a display screen 130 defining a front side 110, an ON button 170, an OFF button 180, a MENU switch 190, and a front camera 120. Also shown in FIG. 1 is an image 140 being displayed in the display screen 130.

As indicated above, the handheld computing device 100 is defined broadly. In FIG. 1, the handheld computing device 100 is shown as a smart phone having a display screen 130, an ON button 170, an OFF button 180, and a MENU switch 190. However, it should be clear that the current invention may be used to accommodate any computing device by making certain adjustments to the power source 30, the case 55 and the dock 60. Moreover, the format and configuration of the handheld computing device 100 may vary significantly due to the brand and version of the device. It is very likely that a handheld computing device 100 does not have any of the buttons or switches shown in FIG. 1. Nevertheless, it should be clear that the current invention provides an illumination device 1 that may accommodate all kinds of computing devices, especially handheld computing devices.

The image 140 here in FIG. 1 is shown to demonstrate possible display on the screen when the handheld computing device is in use. The image 140 may be the image of a party engaged in a video call or video conference with the user of the handheld computing device. The image 140 may also be the image of the user of the handheld computing device when a photograph or video is being captured by the front camera. When it is the image of the user of the handheld computing device, the user may view the image and adjust the luminous intensity, viewing angles, color, and lighting pattern of the light source 10 to achieve optimized result. The user may also adjust the distance from the handheld computing device 100. The illumination of user with the device will work best when the proper distance from camera to user is achieved. The image 140 may also be the image of any person or subject being captured by a camera other than the front camera. Furthermore, the image 140 may also serve as an illustration of any picture or image that are displayed on the screen 130.

The LEDs, as shown in FIG. 1, are the preferred type of light source 10. As indicated above, it is still possible to use other kinds of light, such as CFL or electroluminescent light, as the light source 10. The basic features of the LEDs may vary according the specific needs of the user and the specific usage for the illumination device 1. For example, the LEDs' luminous intensity, viewing angle, and color may be different from model to model. It is possible to use LED emitting white light or color lights. It is also possible to use color covers or films to enable a white-light LED to show color. Preferably, a plurality of LEDs are used as the light source 10, as shown in FIG. 1. However, it is possible to use only one light. The LEDs may be controlled individually or as a whole regarding switching them on or off, or regarding the luminous intensity, viewing angle, and color of the LEDs. Alternatively, the LEDs may be arranged into subsections that may be controlled as individual subsections. For example, as in FIG. 1, the LEDs may be arranged into three subsections: the left four LEDs, the right four LEDs, and the top two LEDs. As a user of the handheld computing device 100 desires, he/she may choose to turn on and off any subsection or change the features of any subsection according to the ambient light conditions, the posture of the user, and/or the application or process involved.

The LEDs may have different technical specifications and dimensions. In general, the LEDs should be small and match the handheld computing device 100 and the intended usage. Standard T1 LEDs, T1-3/4 LEDs, various kinds of surface mount LEDs, miniature LEDs, mid-range LEDs, high-power LEDs, LED panels, LED modules, and other kinds of LEDs may all be possible choices for specific uses. Some special types of LEDs may be used for special effects.

For example, single wave length LEDs may be used to light therapy. In general, the LEDs may use electricity ranging from 0.1 mW to 50 W, with current ranging from 0.1 μA to 1 A and voltage ranging from 0.1 mV to 250 V. The LEDs may emit white light or color light with particular wavelengths. In a preferred embodiment, the LEDs emit light of warm color temperature, i.e. 2400 Kelvin.

The power source 30 here in FIG. 1 is not an indispensable component of the illumination device 1. In some situations it is preferable to have a power source 30 as shown in FIG. 1. However, in other situations, having a power source presents different advantages. For example, when the illumination device 1 is equipped with a connector to the internal power source of the handheld computing device 100, it is possible for the illumination device 1 to share the power source with the handheld computing device 100, making the structure of the illumination device 1 less complicated and easier to control. However, when it is desirable to have a long battery life or to have a changeable illumination device 1 that may fit different kinds of handheld computing device 100, it is probably advantageous to have an power source, like the power source 30 shown in FIG. 1, because the power connector may not fit with all the different handheld computing devices.

In FIG. 1, the power source 30 may be a battery. However, it may well be other kinds of power sources as long as the light source 10 is provided with energy. If a battery is used, the power source 30 may be a disposable battery or a rechargeable battery, addressing different concerns such as cost and convenience. In terms of chemical composition, many kinds of batteries may be used. The types of batteries to be used as the power source 30 include but are not limited to: zinc-carbon batteries, alkaline batteries, aluminum batteries, dry-cell batteries, lead-acid batteries, lithium batteries, nickel batteries, potassium batteries, and sodium-ion batteries.

The power source 30 is designed to provide power to the LEDs. When the voltage or current provided by the power source 30 is insufficient to power the LEDs, it is possible to include a regulator circuit, such as a buck-boost converter, to enhance the output from the power source and ensure that the LEDs are adequately supplied. Such regulator circuits are well-known in the arts. In addition, the illumination device 1 may further comprise a battery meter that measures the battery life and informs the user to change batteries when necessary. The technology for such battery meter is also well known in the arts.

In addition to providing power to the LEDs, the power source 30 may serve as a backup power source to the handheld computing device 100. With proper connections between the handheld computing device 100 and the illumination device 1, both in terms of control circuitry and electricity connections, it is possible that the power source 30 may be used to directly provide energy to the handheld computing device 100, enabling a longer overall battery life and providing more flexibility. When the power source 30 is rechargeable, the handheld computer device 100 may also be recharged, enabling a convenient solution for supplying power to both the illumination device 1 and the handheld computing device 100.

It should be noted that FIG. 1 is only supposed to be illustrative as to the position and arrangement of the case 55 and the power source 30. The power source 30 may be located at other positions. For example, the power source 30 may be shield in a chamber attached to the back of the case 55.

In FIG. 1, an illumination device switch 70 is also shown. Such an external switch, as a power source 30, is not an indispensable part of the illumination device 1. If the illumination device 1 is sufficiently integrated with the handheld computing device 100, it is possible to control all aspects of the LEDs through the buttons, menus, and switches of the handheld computing device 100. Such a design may also provide a full spectrum of options as to the individual, sub-sectional, or whole group of LEDs' luminous intensity, viewing angle, color, and lighting patterns. However, in certain situations, having an external switch may be desirable because it affords a quick and easily accessible control for the lights.

It should be noted that the switch 70 may have different designs to accommodate different needs. The switch 70 may be mechanical, electrical or logical. In its most simple form, switch 70 may turn on and off all the LEDs without any other adjusting capacities. However, switch 70 may also be designed as a dimmer that dictates the brightness, or luminous intensity of the LEDs in a certain range. One possible design is that the switch 70 may control mechanical means of adjustment such as articulating lens or lenses covering the LEDs, allowing for change of illumination intensity. To enable the switch 70 to perform such a function, some well know circuits such as a potentiometer may be included in the illumination device. Moreover, switch 70 may have a more complex design to control the individual, sub-sectional, or whole group of LEDs' luminous intensity, viewing angle, color, and lighting patterns.

The current invention discloses an attachment assembly that affixes a light source 10 to a computing device. In the embodiment shown in FIG. 1, while the computing device is a handheld computing device 100, the attachment assembly is a case 55 having a recess that partially encases the handheld computing device 100, leaving the front side 110 largely exposed so that the display screen 130 may be viewed clearly and the front camera 120 may be unblocked. The handheld computing device 100 is snapped in the recess of the case 55. The LEDs are mounted on the edges of the case 55 to direct light from the LEDs in a generally perpendicular direction to the front side 110 of the handheld computing device 100.

The case 55 may be a one-piece structure or have a multi-piece design for more flexibility and convenience. In addition to attaching the light source 10 to the handheld computing device 100, the case 55 may also provide physical and hygienic protection to the handheld computing device 100, preventing it from damages due to physical impact. The case 55 may be made from materials such as but not limited to: rubber, leather, metal sheet or foil, or plastic such as, but not limited to, polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or some combination thereof. The case 55 may be made of one kind of materials, or different parts of the case 55 may be made of different materials, ensuring optimized protection and feel.

It should be noted that the "snap-in" design is not the only form of attachment to connect the handheld computing device 100 to the case 55. For example, the case 55 may comprise two pieces of cover, either or both may be slidably connected to the handheld computing device 100. It is also possible that the handheld computing device 100 may be fastened to the case with other means such as pre-positions screws, hook-and-loop fastener, riveting, or any other kind of mechanisms allowing a secure attachment. Preferably, the case 55 is removably attached to the handheld computing device 100, allowing easy detaching for higher level of flexibility. However, it would also be acceptable to make the case 55 a permanent fixture of the handheld computing device 100, allowing high level of integration between the handheld computing device 100 and the illumination device 1.

The LEDs may be mounted to the case 55 by any means that allow secure attachment. The LEDs may be welded, screwed, riveted, glued, co-molded, or in any other way linked to or inserted into the case 55. Necessary structures, such as prepositioned magnets or hook-and-loop fasteners, or snaps, may be employed to fasten the LEDs to the case 55. In general, the LEDs may be connected to the case 55 in a permanent or removable manner. Moreover, the approach to connect the LEDs to the case may vary due to the type of LEDs or the type of cases used.

After attachment, the relative positions and the projection angles of the LEDs may still be adjustable, allowing more flexibility as to the area, scope, and depth of illumination. Moreover, the attachment method for the LEDs may be designed in such a way that allows the LEDs to illuminate to a direction not generally perpendicular to the front side the handheld computing device. For example, each LEDs may be mounted on the case with a universal wheel that allows the LED to tilt to all directions. Thus, when it is desirable to use the LEDs with the back camera of the handheld computing device, such designs may allow the LEDs to illuminate in the direction of the back camera.

As indicated above, the attachment assembly may take other forms apart from a case 55. The key is to enable the attachment assembly to attach the light source 10 to the handheld computing device. In the simplest format, the light source 10 may be mounted directly on the handheld computing device, making the light source 10 integral to the handheld computing device. In that case, the attachment assembly may simply comprise the minimum material or structure, such as the magnet, glue, screw, rivet, or welding material that connects the light source 10 to the handheld computing device. In a more complex form, the attachment assembly may comprise simply of one or more attachment strips that have the LEDs mounted on the strips and these strips may be attached to the handheld computing device through any means possible. The strips may be connected to the handheld computing device with screws or hinges, allowing the strips to tilt away from the handheld computing device while maintaining the attachment, enabling the LEDs to illuminate a wider area. When necessary, the LEDs may even be removed from the handheld computing device and the attachment assembly may comprise an extension cord that allow the LEDs to be powered, controlled, and provide illumination to an extended area. Such a design may be helpful to maximize the illumination scope of the illumination device.

The illumination device 1 may further comprise a sensor that detects and measures ambient light conditions. The general structure and circuitry for such sensor is well known in the arts. An ambient light sensor (see FIG. 7) may facilitate the adjustment process for the luminous intensity, viewing angle, color, and lighting pattern of the handheld computing device, making it possible for automatic control when an applicable computer program is installed.

Figure 2:
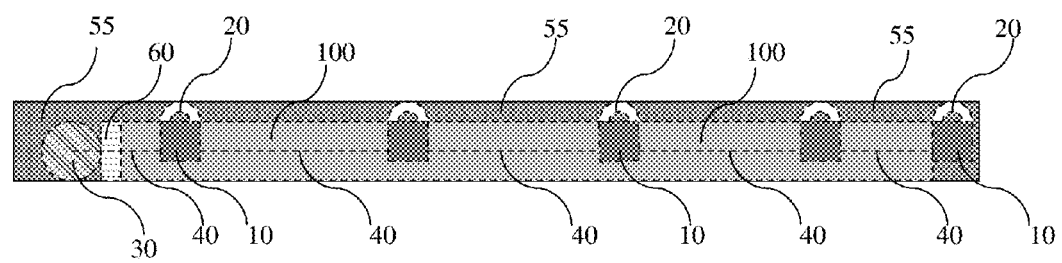
FIG. 2 is an isometric drawing of a side view of the first embodiment of the present invention when an illumination device is connected to a handheld computing device.

FIG. 2 is an isometric drawing of a side view of the first embodiment of the present invention when an illumination device is connected to a handheld computing device. To make the various elements visible, dotted lines are used to illustrate structures that are shielded from view by the case 55. Shown in FIG. 2 is the illumination device 1 having a case 55, a power source 30, a dock 70, a plurality of LEDs covered by light covers 20, and power connector 40 connecting the LEDs to the power source 30. Also shown in FIG. 2 is the handheld computing device 100 being encased in the case 55. For clarity purposes, not all the LEDs or light covers are marked in FIG. 2.

The power connector 40 represents a means to connect the LEDs to a power source, such as the power source 30 shown in FIG. 2. As indicated above, the power source 30 may be a battery or any other kind of power source that is compact and safe. The power connector 40 may be regular electric wiring that is well-known in the arts or any other kinds of circuitry that may be used to connect a light source 10 to a power supply.

The dock 70 may be considered a part of the attachment assembly, together with the case. Like the power connector 40, the dock 70 is not an indispensable structure of the illumination device. However, the dock 70 may play some important roles if it is present. The dock 70 may serve as part of the "snap-in" structure that secures the handheld computing device 100 in the case 55. More importantly, the dock 70 may include connectors that may be plugged into the handheld computing device 100 and serve to integrate the illumination device 1 with the handheld computing device in terms of data sharing, synergistic control, and sharing of power sources. The technology to enable the dock 70 to serve as a connector to the handheld computing device 100 is well known in the arts.

The light covers 20 may be a lens used to diffuse the light from the LEDs, focus the lights from the LEDs, and/or add certain colors when the LED light is white. The light cover 20 may diffuse and soften the light from the LEDs and help to achieve optimal illumination without creating a blind effect.

The light cover 20 may be any kind of diffuser, such as but not limited to: polycarbonate LED diffuser, acrylic LED diffuser, clear LED diffuser, opal LED diffuser, satin LED diffuser, LED diffuser films, or any product or material having LED light diffusing capability. The light covers 20 may also be any kind of lens that is adjustable or unadjustable. The light covers 20 may be colored, changing white light emitted by the LEDs to color lights.

The light covers 20 may be attached to the LEDs or to the case. The manner of attachment may vary according to the materials used and the specific configuration of the different structures. The light covers 20 may be slidable or rolling covers that may be attached or detached easily. The light covers 20 also be glued, screwed, welded, or riveted to the LEDs or the attachment assembly.

The configuration of the light covers 20 may differ from what is shown in FIG. 2. For example, the light covers 20 may take the form of "light strip" or a "light pipe," which may cover more than one LED light. In particular, one "light pipe" may cover the left four LEDs, another one for the right four LEDs, and another for the two LEDs on top, enabling better diffusion and better illumination. Alternatively, a continuous "light strip" or "light pipe" may cover all the LED lights.

Figure 3:
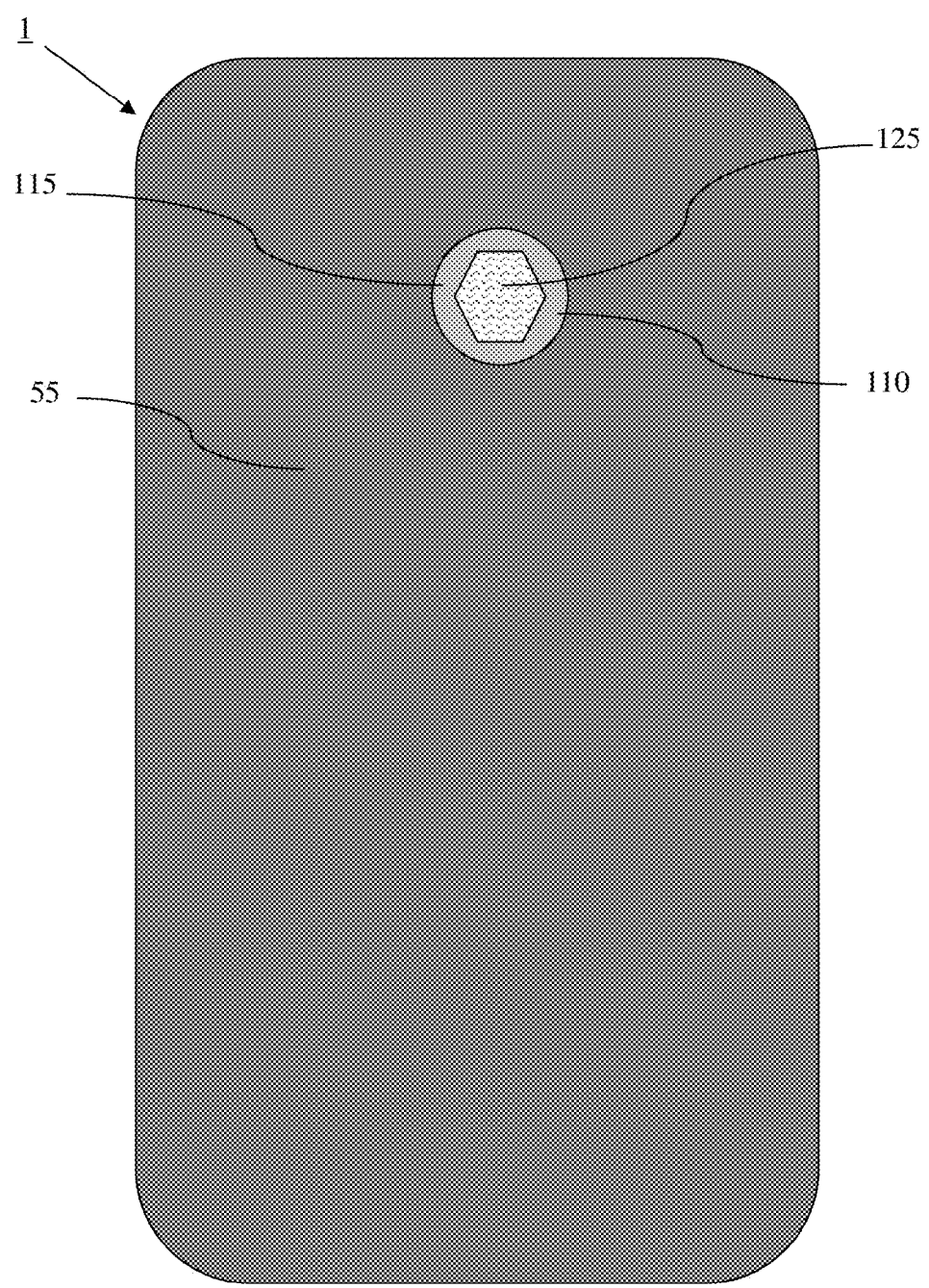
FIG. 3 is an isometric drawing of a back view of the first embodiment of the present invention when an illumination device is connected to a handheld computing device.

FIG. 3 is an isometric drawing of a back view of the first embodiment of the present invention when an illumination device is connected to a handheld computing device. Shown in FIG. 3 are the case 55, the LEDs, and the handheld computing device 100 having a back side 115 and a back camera 125 on the back side 115.

As indicated above, the attachment assembly may take many forms. The case 55 here is one example that allows both light source 10 attachment and general protection to the handheld computing device. Certain methods to mount the light source 10 to the case may allow the light source 10, preferably LEDs, to be adjustable in position and used with the back camera 125. In such circumstances, the LEDs may assist the photo or video capturing process or other applications conducted with the back camera.

The attachment assembly may also comprise other structures that may be combined with the case 55. One possible addition is a hand-free structure such as but not limited to a frame stand and/or a hanger. The frame stand or hanger is preferably foldable and may attach to the back of the case 55, occupying little space with folded. When the frame stand or hanger is unfolded, it may support or hang the handheld computing device in an upright position, allowing the display to be viewed comfortably by a user without occupying a user's hand. More particularly, the side(s) and bottom edge of the case may be able to be made with an angled surface so that the case may serve as part of a stand. For example, the thicker bottom area in a case, adjacent to where the external battery is installed, may provide enough surface to support an IPhone® at an angle. In summary, the frame stand or hanger enables hand-free viewing of the handheld computing device, providing more flexibility as to what can be done with the device.

Figure 4:
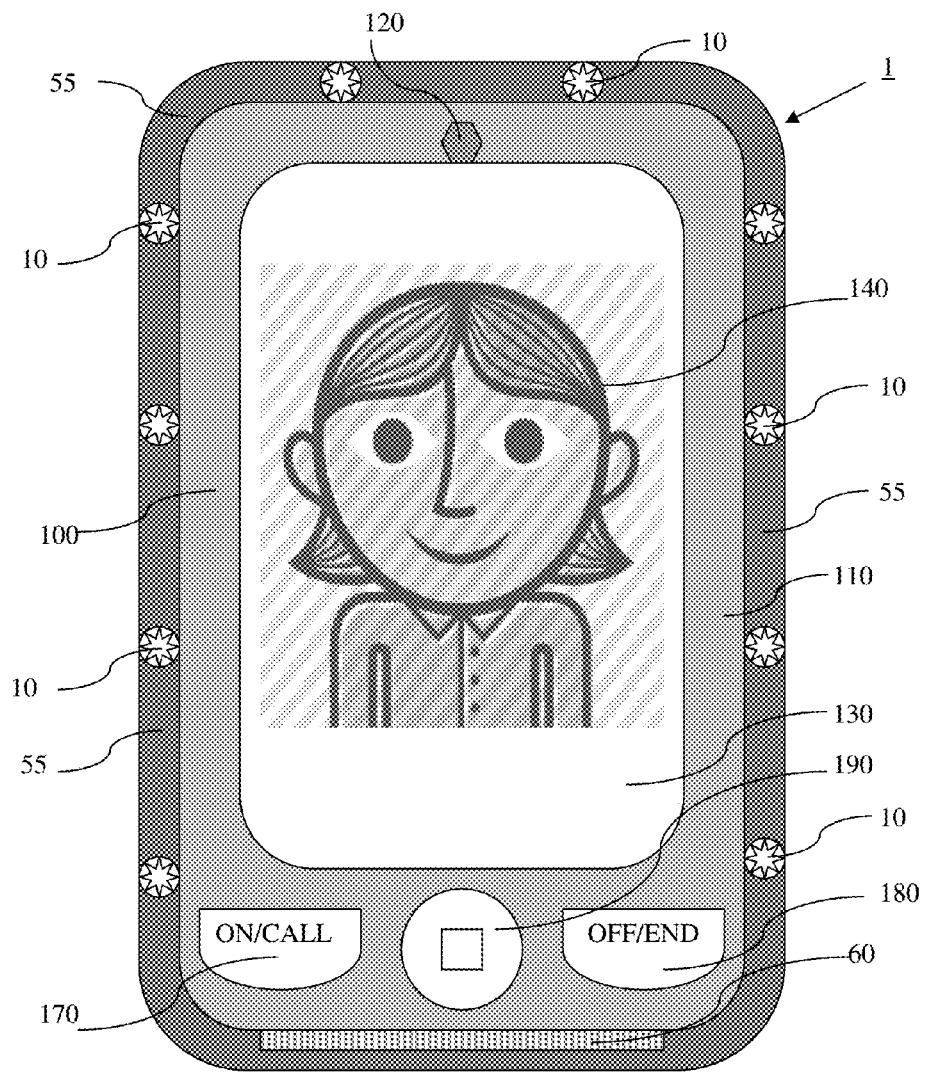
FIG. 4 is an isometric drawing of a front view of a second embodiment of the present invention when an illumination device is connected to a handheld computing device.

FIG. 4 is an isometric drawing of a front view of a second embodiment of the present invention when an illumination device is connected to a handheld computing device. Shown in FIG. 4 are the illumination device 1 attached to a handheld computing device 100, wherein the illumination device 1 comprises an attachment assembly, which comprises a case 55 and a dock 60, and a plurality of LEDs. For clarity purposes, not all the LEDs are marked in FIG. 4. Shown in FIG. 4 is also the handheld computing device 100 having a display screen 130 defining a front side 110, an ON button 170, an OFF button 180, a MENU switch 190, and a front camera 120. Also shown in FIG. 4 is an image 140 being displayed in the display screen 130.

Figure 5:
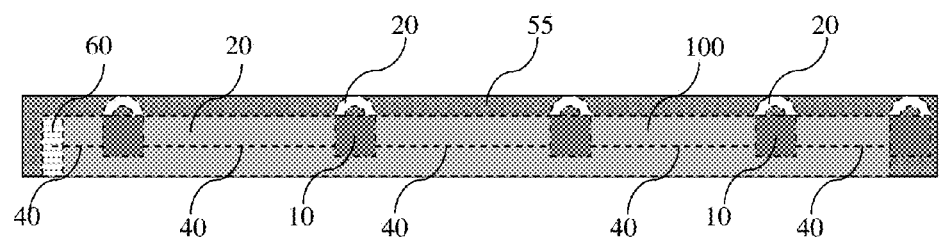
FIG. 5 is an isometric drawing of a side view of the second embodiment of the present invention when an illumination device is connected to a handheld computing device.

FIG. 5 is an isometric drawing of a side view of the second embodiment of the present invention when an illumination device is connected to a handheld computing device. To make the various elements visible, dotted lines are used to illustrate structures that are shielded from view by the case 55. Shown in FIG. 5 is the illumination device 1 having a case 55 and a dock 70, a plurality of LEDs covered by light covers 20, and a power connector 40. Also shown in FIG. 5 is the handheld computing device 100 being encased in the case 55. For clarity purposes, not all the LEDs or light covers are marked in FIG. 5.

FIG. 4 and FIG. 5 illustrate a second embodiment of the current invention. In this embodiment, the power source and the switch shown in FIG. 1-2 are no longer present. The light source 10, here a plurality of LEDs, is connected by the power connector 40 to the internal power source of the handheld computing device 100. Moreover, with further integration of the illumination device 1 and the handheld computing device 100, the luminous intensity, viewing angle, color, and light pattern of the light source 10 may be adjusted by the switches, buttons, and menus of the handheld computing device, eliminating the need for an external control switch. Such a design simplifies the basic structure of the illumination device 1, yet requiring higher level of connection and synergy between the illumination device 1 and the handheld computing device.

It should be noted that the second and third embodiments may not necessarily be described to the fullest extent because such descriptions are provided for the first embodiment. In particular, the description for any of the embodiments should be considered included other embodiments as long as there is not conflict between the descriptions.

Figure 6:
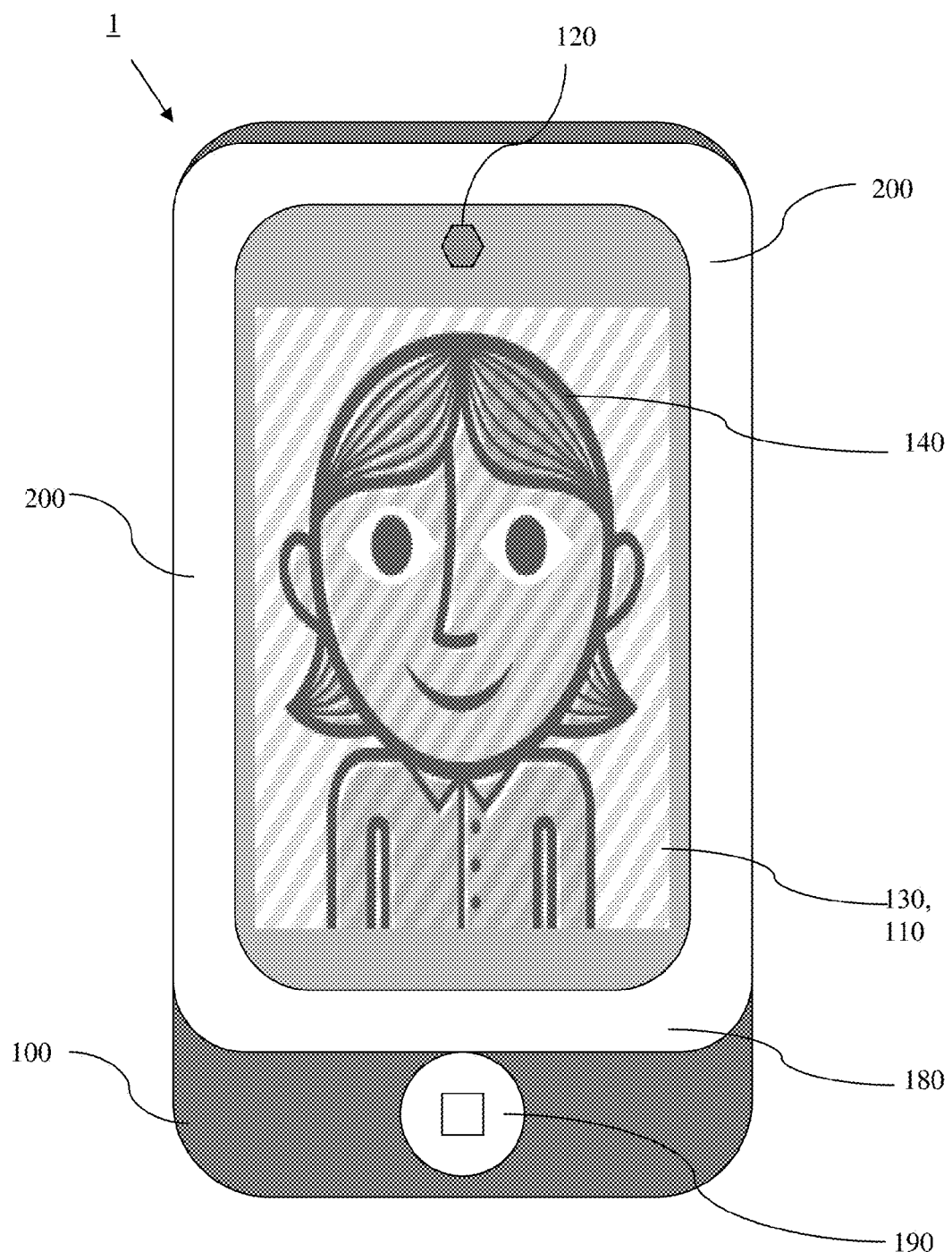
FIG. 6 is an isometric drawing of a front view of a third embodiment of the present invention when an illumination device is connected to a handheld computing device.
Figure 9:
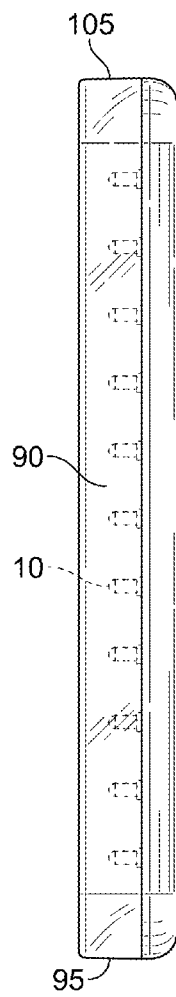
FIG. 9 is a side view of an embodiment of the present invention taken along the right side of the illumination device.

FIG. 6 is an isometric drawing of a front view of a third embodiment of the present invention when an illumination device is connected to a handheld computing device. Shown in FIG. 1 are the illumination device 1 attached to the handheld computing device 100, wherein the illumination device 1 comprises a light source 10 comprising a circular light panel 200 encircling a display screen 130. Shown in FIG. 1 is also the handheld computing device 100 having a display screen 130 defining a front side 110, a MENU switch 190, and the front camera 120. Also shown in FIG. 1 is an image 140 being displayed in the display screen 130.

In the third embodiment, some other features such as the attachment assembly, the power source 30, the dock 60, and the illumination device switch 70 are not displayed. However, it should be noted that these structures may still be present, but shielded from direct view. As indicated above, electroluminescent light using algae-based wire and panels, such as the light based on RiLi technology (produced by Revolution in Lighting, Inc.), may be used as the light source 10. The design of the circular light panel 200 is particularly suitable to use such lighting technology, which is in general energy efficient, long lasting, bright, and having a wide viewing angle. The circular light panel 200 is preferably thin and may attach to the handheld computing device 200 using an attachment assembly comprising any kind of connecting mechanism, such as industrial glue. It should also be noted that the design, size, and shape of the light panel 200 may vary according to functional and/or aesthetic needs. The power supply, the control system, and the possible varying display of lighting by the light source 10 are fully described above and below.

Referring now to FIGS. 7 and 8, there is another embodiment of the present invention as shown from the front and back, respectively. The illumination device 1 takes the form of a case 55 and is shown without a computing device 100 (see FIG. 15) attached thereto. Generally, the embodiment has a front side 110, back side 115, top 105, bottom 95, and at least two side surfaces 90. Each of these surfaces interact to generally define a recess 65 as shown in FIG. 7.

Each of the side surfaces 90 has a generally horizontal extension or light rail that extends past and from the front surface 110. The light rails generally comprise a light cover 20 and a plurality of light sources or LEDs. The plurality of light source 10 are preferably LEDs that emit white light. The white light can be produced via mixed-color lighting or phosphor conversion or any other suitable technology. In some instances, it may be desirable to have the LEDs be capable of producing different colors and/or differing shades of light and such LEDs may be incorporated as appropriate. The light source 10 may be any type of LEDs as previously described herein and are preferably surface mounted LEDs, or may alternatively be any other suitable type of light source, such as, without limitation incandescent, fluorescent, or high-intensity discharge (HID) bulbs.

The light covers 20, here, are coverings for the LEDs. The light covers 20 may cover, but not touch, each light source 10 individually or cover a number of light source 10 simultaneously. In other embodiments, the light covers 20 may cover, and touch, any one or more light sources 10. The light covers 20 are preferably translucent, and in some cases transparent, plastic coverings that serve to diffuse the light as it passes through these coverings. The light coverings 20 may be removable and may comprise different materials and colors to provide a particular degree of diffusion or a tint, shade, or other color distortion or any combination thereof to the light source 10. In other embodiments, the light covers 20 are permanently attached thereto.

Further, each of the light covers 20 are designed to permit light to be emitted outwards from the illumination device 1 along at least a 180° arc. This is due to the fact the light covers 20 are generally shaped to cover the area above the light source 10 and on each side of the light source 10 to the point at which the light source 10 terminate at the device. In some instances, the light covers 20 may further be disposed past the point of termination of the light source 10 and may allow for rear facing light source 10 using the same principles as the front facing light sources described herein.

Figure 10:
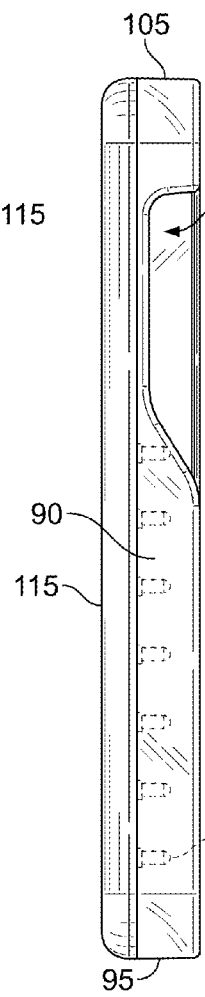
FIG. 10 is a side view of an embodiment of the present invention taken along the left side of the illumination device.
Figure 11:
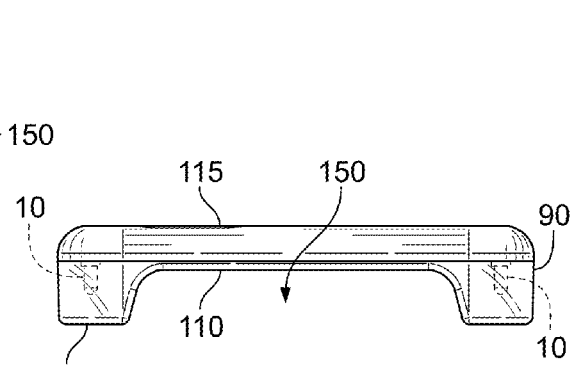
FIG. 11 is a top view of an embodiment of the present invention.

The light covers 20 are preferably disposed along the length of the side surface(s) 90, but may fully encircle the case 55. The light covers 20 may also be intermittent with gaps or spaces in between a number of separate light covers. In a preferred configuration, one light rail is longer than the other light rail (see FIG. 10). This serves to provide access to features of a computing device, such as a smart phone, which are typically disposed on the left-side of the device.

Where the light covers 20 intersect with the top area and bottom area of the illumination device 1 a securement mechanism 75 is formed extending therefrom. This securement mechanism 75 may be located in at least one corner area and up to four or more corner areas. In a preferred embodiment, there are at least two securement mechanisms 75. The securement mechanism 75 manifests itself as a tab or extension that extends substantially perpendicularly from the top of the light cover 20. Preferably, the securement mechanisms 75 are disposed on opposite ends and opposite sides of the illumination device 1. This enables, for example, one securement mechanism to be disposed on the upper left side and the other to be disposed on the lower right side. This disparity provides the most secure arrangement of the two form securement mechanism. With three or more securement mechanisms, the arrangement is less vital as the extra points of contact override the necessity for a particular arrangement.

When a computing device is pushed downward into the recess the securement mechanisms 75 slide over a surface of the computing device thereby securing the position of and retaining the computing device therein. In order to remove the computing device, the case 55 is flexed downwards (away from the computing device) slightly, allowing the securement mechanisms 75 to withdraw or recede from covering the computing device and the computing device is subsequently removed.

Further features of the illumination device 1 include an aperture 135 to provide unrestricted or uninhibited access for a rear facing camera of the computing device. The position of the aperture 135 can be varied to accommodate any number of sizes, shapes, and positions. An ambient light sensor 145 may be disposed thereon to automatically adjust the intensity of the light sources 10 in accordance with the ambient light. A charging port 85 enables charging of the power source 30 (see FIG. 1) which is a rechargeable power source and may be located within the illumination device itself.

In addition, the illumination device 1 may provide for at least one depressible or touch sensitive button 80. In a preferred embodiment this button is located on the back side 115 of the illumination device 1. The touch sensitive button 80 controls an operative state of the light sources 10. This may include powering the light sources 10 on or off as well as serving to dim or intensify the light sources 10 as needed.

In order to dim or intensify the light sources 10 one would depress and continue to apply pressure to or leave their finger remaining over the button area. This action causes the light sources 10 to either dim or intensify until the button is ceased to have been engaged. Further engagement of the button 80 will result in further dimming or intensifying based on the current setting of the light sources 10.

In FIGS. 9-12, the embodiment shown in FIGS. 7-8 is further shown from the right side, left side, top, and bottom, respectively. Here, the overall, shape and structure of the illumination device 1 is more apparent, as are the interactions between the front side 110, back side 115, top 105, bottom 95, and sides 90. The light sources 10 are shown from one configuration arrangement.

There may be cutouts or voids 150 between areas of the light rails where such voids or spaces 150 have been strategically placed to enable interaction with the computing device once the computing device has been secured thereto. As shown, such voids 150 are shown along the top, bottom, and mid to upper left side of the case. These positions are the typical locations of buttons and other interactive features of computing devices, namely smart phones. However, the exact arrangement, size, and shape of such voids 150 can be altered as necessary.

Figure 12:
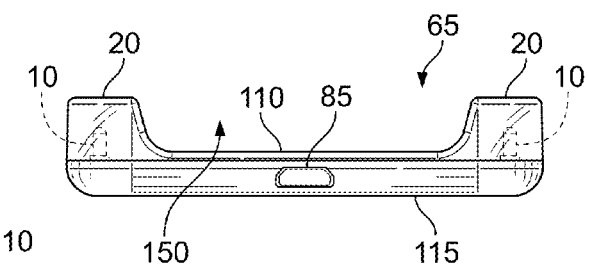
FIG. 12 is a bottom view of an embodiment of the present invention.

As shown in FIG. 12, the charging port 85 is typically located in the bottom of the illumination device 1. The charging port 85 may be any type of suitable port including those known in the art such as a universal serial bus (USB) port, which provides for both charging downstream ports and dedicated charging ports and other suitable charging technology. The port is operably coupled to the power source contained therein to charge it as required.

Figure 13:
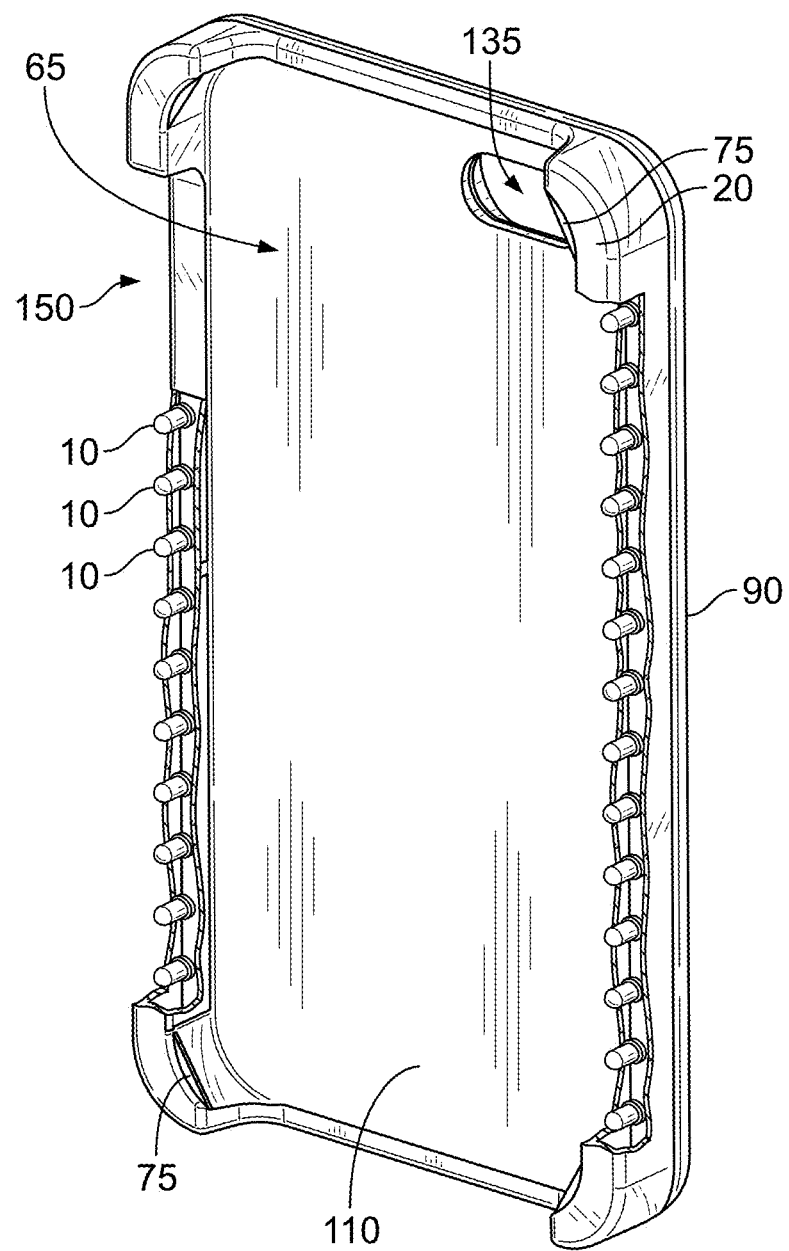
FIG. 13 is a perspective view of an embodiment of the present invention with a portion thereof removed exposing the light sources residing therebelow.

Referring now to FIG. 13, the light covers 20 have been partially removed to expose the light sources 10 thereunder. This arrangement and number of light sources 10 is one of but innumerable such arrangements and is intended to be merely representative of one such arrangement. It can also be seen how one of the light rails (left light rail in this embodiment) contains more light sources 10 and is longer in length than the other light rail (right light rail in this embodiment). In other embodiments, the configuration as to which is the longer light rail containing more light sources 10 and which is the shorter light rail containing fewer light sources 10 may be reversed. As should be understood, the number of light sources on each rail and the length of each rail may be varied as may be desired in order to contain any number and/or arrangement of light sources 10 on each rail, and the length of each rail may also be varied so as to be longer or shorter in length, as desired.

Figure 14:
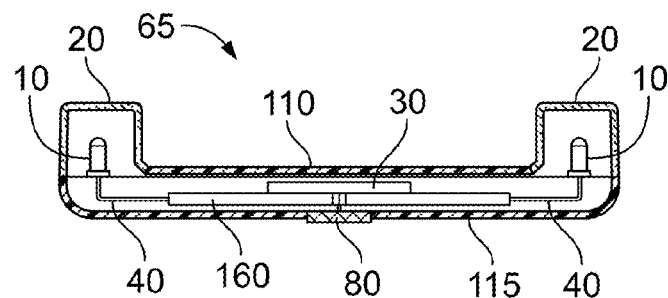
FIG. 14 is a cutaway view taken from a bottom side of an embodiment of the present invention.

FIG. 14 demonstrates an iteration of the present disclosure as shown from a cutaway sectional view from the view in FIG. 12. As shown, there is generally a front side 110, a back side 115, and a side surface 90 which service to form the recess 65 for receiving a computing device. Emanating or rising from the front side 110 is the light covers 20. The light covers 20, as shown, as generally as an inverted "u"-shaped, but may bear a more rounded "c" or other shape depending on the light source 10 used and the preferences for diffusing that light source 10.

The light covers 20 are generally unitary, single channels that run along either side, or top or bottom of the front side 110. The light covers 20 may be disposed separately or may be connected forming a continuous cover traveling the length of the perimeter. In some embodiments the light covers 20 may be oriented to be positioned along the back side 115 as well. The light covers 20, as previously noted, are configured to diffuse light. Such diffusion may be accomplished by use of certain materials, textures, patterns, or the like or any combination thereof comprising the light covers 20. For example, denser materials are typically more efficient in diffusing light and such a material may be required with more luminous light sources.

Internally, a printed circuit board (PCB) 160 is shown with a rechargeable power source 30 coupled thereto. Power connectors 40, such as wiring, couples the light sources 10 to the power source. The depressible button 80 can function to alter an operative state of the light sources 10 including to turn light sources on/off as well as change the luminous output of the light sources 10.

Figure 15:
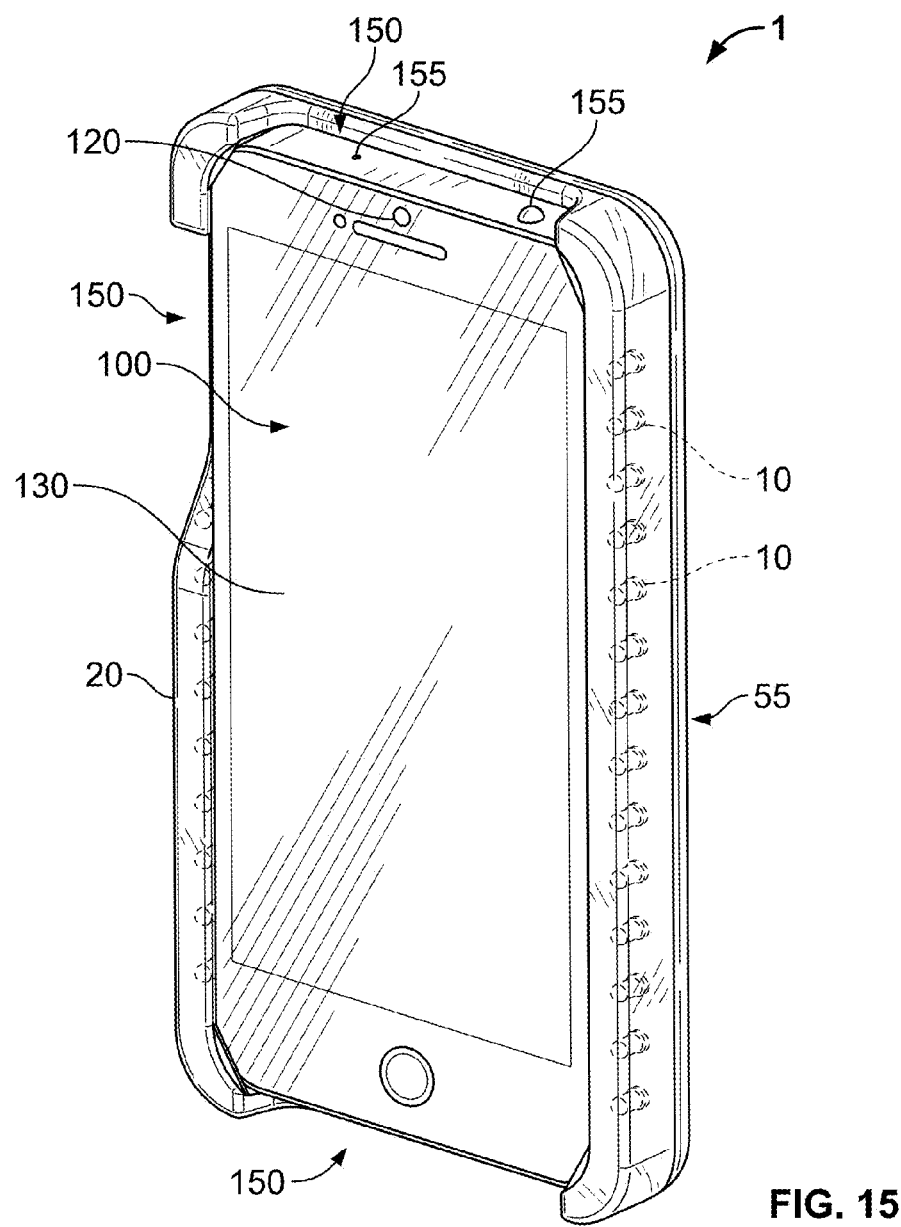
FIG. 15 is a perspective view of an embodiment of the present invention with a handheld computing device coupled thereto.

In FIG. 15, the illumination device 1 is shown from a perspective view with the computing device 100 removably coupled thereto. The computing device 100 has a display screen 130, front facing camera 120, and computing device controls 155, and other not explicitly named features. By partially surrounding the computing device with diffused light from the light sources 10 and light covers 20, the present invention enables even and consistent lighting across a subject thereby creating desirable captures of static and time varying images as further described herein.

Further, as shown in FIG. 15, the light sources 10 are positioned equidistant from one another. The spacing or gap between these light sources 10 may vary but is preferably about 0.1 inch to about 2 inches, and more preferably about 0.25 inches. The gap or spacing being defined as the area where the placement of one light source ends and another begins. The light sources 10 may reside on a strip that operably couples each light to one another or may otherwise reside directly on the printed circuit board as described. Other functional implementations may also be employed and are covered under the purview of this invention.

In some instances, the general concept described herein in FIGS. 7-14 may be capable of being used with a rear facing camera as well. In such an embodiment, the orientation of the light rails including the light sources and light covers would be rear facing instead of forward facing. The recess, securement mechanisms, apertures, and the like would relatively stay in the same orientation as with a forward facing implementation. In some embodiments, there may be both forward facing and rear facing light rails containing light sources and light covers as described herein. In such an embodiment, the light sources (forward facing and rear facing) may be able to be independently controlled thus enabling the rear facing light sources to be turned on/off as necessary and enabling the same functionality to occur with the forward facing light sources.

As indicated above, it is in the purview of the current invention, as described in the Figures, that a series of computer applications or programs may accompany the illumination device disclosed herein. These applications may facilitate the use of the illumination device and ensure that it is safe, well-controlled, and optimized to assist the use of some other applications. However, it is of note that this is not a requirement and, in fact, it may be more practical to operate the present invention as a standalone embodiment. This gives full control over the illumination device 1 to the user. The user can couple the illumination device 1 to a computing device 100 as needed.

As indicated above, it is in the purview of the current invention that a series of computer applications or programs may accompany the illumination device disclosed herein. These applications may facilitate the use of the illumination device and ensure that it is safe, well-controlled, and optimized to assist the use of some other applications.

For example, when the illumination device is sufficiently connected and synergized with the computing device, a program may be used to specifically control the light source of the illumination device to adjust the luminous intensity, viewing angle, color, and lighting pattern of the light source. A user of a handheld computing device may turn on the illumination device simply to provide general illumination. A handheld computing device, in such situations, may be used as a flashlight in a dark place. When the illumination device is equipped with an ambient light sensor, as indicated above, it is possible to have a program that automatically adjusts the luminous intensity of the light source based on ambient light conditions.

Another example is a video call program that specifically integrates the usage of the illumination device. Before the user transmits his/her image, he/she may view the image on the display screen to obtain optimal results. The program may control both the camera and the illumination device, allowing easy adjustment without switch to another program that controls the camera. The program may facilitate this process by setting certain criteria that help the user to optimize the image. For instance, the program may display on the screen a dotted-line contour of a generic human face, while the user of the handheld computing device may adjust the distance of his/her face to the device and/or the zoom and focus of the front camera to make the image of his/her face to fit the dotted-line contour, achieving optimal results. A slight variation of this design is to display a generic eye contour that allows the user to make adjustment to match his/her image to the contour. Or the program may directly show suggestions or recommendations on the display screen to urge the user to turn the illumination device on, make it brighter or dim it, or to adjust the zoom and/or focus of the camera for optimal image. In essence, the illumination intensity may be adjusted according to the optimal focal length of the camera. Such a basic design should also be applicable to other programs. Similarly, a photo or video capturing program having the same features may be installed to assist the use of the illumination device. The photo or video capturing program may aid the user in adjusting the illumination device to obtain the best result as to picture quality.

Another example is a "makeup mirror" application that integrates the illumination device with the front camera. In some cases, a user of a handheld computing device would like to see his/her own image to be captured by the front camera and be displayed on the display screen simultaneously. The user then would be able to assess his/her appearance and make necessary adjustments. To achieve optimal results, the "makeup mirror" application would allow the user to control the luminous intensity, viewing angle, color, and lighting pattern of the light source in the illumination device, or such features may be adjusted automatically by the application when the ambient light sensor is included and used. Combined with the frame stand or hanger structure that may be a part of the attachment assembly, the user may set the handheld computing device in an upright position without actually holding the device, freeing up both of the user's hands for optimal maneuvering, while the whole process is being conducted under ideal illumination.

Also indicated as above, the illumination device may serve as indicator or signaling source for the status of the handheld computing device. For example, when there is an incoming call to a small phone, a handheld computing device, the light source of the illumination device may light up or change the luminous intensity, viewing angle, color, and/or lighting pattern of the lights. The lights may flash or subsections of the lights are turned on rotationally. A more complex set up may allow the user of the smart phone to establish and manage specific profiles—specific combination of luminous intensity, viewing angle, color, and/or lighting pattern—for the illumination device. The user may choose different profiles to match different callers. Such an application controls the illumination device in somewhat similar ways as ring tones are managed for smart phones, further enriching the user experience.

Furthermore, since the illumination device may be used as signals for the computing device to which the illumination device is connected, it is possible that the illumination device may be integrated with other program or application being used by the computing device. For example, it is possible to set up the illumination device that when a certain game is being played, the illumination device is turned on and the luminous intensity, viewing angle, color, and/or lighting pattern of the lights change with the progress of the game. A similar implementation is also possible for music. Certain light profiles may be integrated with the music program on the computing device, allowing the lights to flash rhythmically, for example, when the music is being played.

Once coupled to the computing device 100, the user can change the intensity or any other property of the light sources 10 by using controls, switches, and the like embedded with the illumination device 1 itself. Further, this standalone usage is enhanced by the rechargeable power source contained within the case 55. Thus, the power source may be recharged as necessary without requiring the computing device 100 to be recharged, nor would it drain a charge from the power source of the computing device.

In some embodiments, the illumination device may implement shock absorbing features designed to protect the computing device from falls, shaking, and the like. In other embodiments, a covering such as a glass or acrylic may overlay the computing device's display to prevent similar harm to the display of the computing device. In yet other embodiments, the light sources may flash, strobe, or otherwise be used to signify that an emergency is occurring or to otherwise garner attention from another. In other embodiments, a "selfie stick" or other apparatus may be coupled to the illumination device to provide flexibility in use. In some embodiments, the illumination device may have slots for cash, credit cards, debit cards, and the like. Even still, in other embodiments there may be an integrated battery and/or signal booster which can provide extended battery life and enhanced signal quality when necessary.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An illumination device capable of being removably coupled to a computing device, the illumination device comprising:
a case sized to receive the computing device in a receiving area;
at least one securement mechanism that retains the computing device in the receiving area;
at least one light source, the at least one light source being covered by at least one light cover at least partially disposed on at least one nontransparent portion of the case,
wherein the at least one light cover modifies an appearance of light produced by the at least one light source, the at least one light cover being at least one of transparent or translucent;
a light control mechanism configured to change an operative state and/or an intensity of the at least one light source; and
a power source operably coupled to the at least one light source.

2. The illumination device of claim 1, wherein the case enables volume adjustment of the computing device while retained by the case.

3. The illumination device of claim 1, further comprising an ambient light sensor,
wherein the ambient light sensor automatically adjusts an intensity of the at least one light source based on an amount of ambient light received by the ambient light sensor.

4. The illumination device of claim 1, wherein the at least one light source generates a luminous response based on an operative state of the computing device.

5. The illumination device of claim 1, wherein the light cover diffuses light emitted from the at least one light source.

6. The illumination device of claim 1, further comprising an aperture, the aperture being substantially aligned with an image capturing mechanism of the computing device.

7. The illumination device of claim 1, further comprising a charging port,
wherein the charging port enables the power source to be charged.

8. The illumination device of claim 1, wherein the at least one light source is a plurality of light sources disposed along at least a portion of a periphery of a front surface of the case.

9. The illumination device of claim 1, wherein the at least one light source is a plurality of light sources, with each of the plurality of light sources configured to produce at least a first color and/or a second color.

10. The illumination device of claim 1, wherein the at least one light cover is one light cover and the at least one light source is a plurality of light sources.

11. An illumination apparatus comprising:
a case sized to receive an image capturing device;
a securement mechanism that couples the case to the image capturing device;
at least one light source coupled to the case, the at least one light source covered by at least one light cover at least partially disposed on at least one nontransparent portion of the case,
wherein the at least one light cover is configured to alter light emitted by the at least one light source, the at least one light cover being at least one of transparent or translucent;
a light controller operably coupled to the at least one light source; and
a power source operably coupled to the at least one light source.

12. The illumination apparatus of claim 11, wherein the at least one light source emits light in a direction of a picture taking area of the image capturing device.

13. The illumination apparatus of claim 11, wherein the image capturing device is a smart phone.

14. The illumination apparatus of claim 11, wherein the securement mechanism is an edge that retains the image capturing device to the case.

15. The illumination apparatus of claim 11, wherein the light controller is a depressible button.

16. The illumination apparatus of claim 15, wherein the depressible button is configured to change an operative state and/or an intensity of the at least one light source.

17. The illumination apparatus of claim 11, wherein the power source is a rechargeable battery.

18. The illumination apparatus of claim 11, wherein the case includes a front side and a back side, wherein the at least one light source is mounted to at least one of the front side or the back side.

19. The illumination apparatus of claim 11, further comprising a dock electrically connected to the power source, wherein the power source is operable to charge a power source of the image capturing device when the image capturing device is connected to the dock via the case.

20. The illumination apparatus of claim 11, wherein the at least one light source flashes, strobes, changes color, creates patterns or a combination thereof in response to an operative state of the image capturing device.

* * * * *